(12) United States Patent
Fritsch et al.

(10) Patent No.: US 7,152,575 B2
(45) Date of Patent: Dec. 26, 2006

(54) METHOD FOR DETERMINING THE INJECTION DURATION IN AN INTERNAL COMBUSTION ENGINE

(75) Inventors: Jürgen Fritsch, Regensburg (DE); Treerapot Kongtoranin, Bangkok (TH); Antonio Lentini, Köln (DE); Michael Nienhoff, Regensburg (DE); Diego Valero-Bertrand, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/246,425

(22) Filed: Oct. 7, 2005

(65) Prior Publication Data
US 2006/0259227 A1 Nov. 16, 2006

Related U.S. Application Data

(63) Continuation of application No. PCT/EP04/03303, filed on Mar. 29, 2004.

(51) Int. Cl.
*F02B 3/10* (2006.01)

(52) U.S. Cl. ........................ 123/299; 701/104; 701/105
(58) Field of Classification Search ................ 123/299; 701/104, 105
See application file for complete search history.

(56) References Cited

U.S. PATENT DOCUMENTS

| | | | |
|---|---|---|---|
| 5,402,760 A | 4/1995 | Takeuchi et al. | 123/300 |
| 6,311,669 B1 | 11/2001 | Przymusinski et al. | 123/300 |
| 6,752,126 B1 | 6/2004 | Pfaeffle et al. | 123/436 |
| 2002/0096140 A1* | 7/2002 | Heinzelmann | 123/299 |
| 2003/0029415 A1 | 2/2003 | Pfaeffle et al. | 123/299 |

FOREIGN PATENT DOCUMENTS

| | | |
|---|---|---|
| DE | 197 12 143 A1 | 9/1998 |
| DE | 199 37 148 A1 | 2/2001 |
| DE | 101 23 035 A1 | 1/2002 |
| EP | 0 570 986 BS | 11/1993 |
| EP | 1 064 457 A1 | 3/1999 |
| WO | 99/47802 A1 | 9/1999 |

OTHER PUBLICATIONS

International Search Report; PCT/EP2004/003303; 8 pp., Aug. 11, 2004.
Translation of Written Opinion of International Search Authority; PCT/EP2004/003303; 2 pp., Aug. 11, 2004.

* cited by examiner

*Primary Examiner*—Erick R Solis
(74) *Attorney, Agent, or Firm*—Baker Botts L.L.P.

(57) ABSTRACT

A method for correcting the injection duration of injections is based on pressure fluctuations of preceding injections. The injection duration is determined on the basis of a mapping value and of a correction value. The mapping value is read out from a mapping according to the fuel pressure and according to the amount of fuel to be injected. The correction value is calculated according to the time interval between the subsequent injection and at least one latter injection. This enables a precise determination of the injection duration and thus a precise metering of the desired amount of fuel.

17 Claims, 4 Drawing Sheets

METHOD FOR DETERMINING THE INJECTION DURATION IN AN INTERNAL COMBUSTION ENGINE

CROSS-REFERENCE TO RELATED APPLICATIONS

This application is a continuation of co-pending International Application No. PCT/EP2004/003303 filed Mar. 29, 2004, which designates the United States of America, and claims priority to German application number 10316811.7 filed Apr. 11, 2003, the contents of which are hereby incorporated by reference in their entirety.

TECHNICAL FIELD

The invention relates to a method for determining the injection duration of an injection of fuel into an internal combustion engine and a method for determining the correction value.

BACKGROUND

In the injection of fuel into an internal combustion engine it is necessary, because of emissions regulations and a desired low fuel consumption of the internal combustion engine, to determine precisely the quantity of fuel to be injected. The fuel quantity injected is determined by the injection duration and the fuel pressure. In common rail injection systems a plurality of injection valves is supplied with fuel at an adjustable pressure from a fuel reservoir. Through the opening of the injection valves during an injection process pressure fluctuations occur in the fuel reservoir, in the injection valve and in its feed line. The pressure fluctuations change the fuel pressure and must be taken into account in calculating the injection duration.

Known from EP 1 064 457 B1 is a method for determining the injection duration in an internal combustion engine operating with direct fuel injection, in which a total quantity of fuel that is to be supplied to a cylinder of the internal combustion engine is split into at least two injection processes per cylinder stroke. The pressure fluctuation arising through the preceding injection in the injection valve and in the line between the high-pressure reservoir and the injection valve is taken into account in determining the injection duration for the next injection process. To take account of the pressure fluctuations a correction term is determined, with which the pressure of the high-pressure reservoir is corrected. The injection duration is precisely determined using the corrected pressure value. The injection duration is calculated in dependence on the quantity of fuel to be injected and the corrected pressure value.

SUMMARY

It is the object of the invention to provide an improved method for determining the injection duration of a second injection following a first injection of a combustion process. It is further the object of the invention to provide a simple method for determining the correction value.

The object of the invention can be achieved by a method for determining the injection duration of an injection of fuel into an internal combustion engine, whereby the injection duration is determined in dependence on the fuel pressure and in dependence on the quantity of fuel to be injected, the method comprising the steps of determining the injection duration from a first mapping value and a correction value, reading out the mapping value from a characteristic map in dependence on the fuel pressure and in dependence on the mass of fuel to be injected, and calculating the correction value in dependence on the time interval between the following injection and the last injection.

Such a method has the advantage that the injection duration is calculated more simply and more precisely. To calculate the injection duration a mapping value and a correction value are used. The mapping value is read out from a characteristic map in dependence on the fuel pressure and on the mass of fuel to be injected. The correction value is calculated in dependence on the time interval between the following injection and at least a last injection. Through the use of the correction value the influence on the injection quantities of the pressure fluctuations caused by at least the last injection is allowed for in a simple manner. With the method according to the invention, in contrast to the method known from the prior art, it is not necessary to determine a pressure correction using relatively complex and costly methods. Because the correction value directly influences the injection duration in dependence on the time difference between the last injection and the following injection, a simple and rapid calculation of a precise injection duration is possible.

The correction value can be described using a function which includes an oscillation factor which takes account of the influence on the injection quantity of the pressure fluctuations generated by at least the last injection in determining the injection duration. The oscillation factor may include a sine and/or cosine function. Parameters of the function may depend on the pressure and the temperature of the fuel and on the durations and quantities of the injections. The function may include correction values, the correction values may encompass operationally determined changes in the hydraulic components, in particular in injection valves. In calculating the duration of an injection the influence of all the preceding already corrected injections of an injection process may be taken into account. The correction factor may include a damping factor, the damping factor may take account of decaying of the pressure fluctuation generated by at least the last injection. The damping factor can be configured in the form of a decaying exponential function, and the exponential function may depend on the time difference between the following injection and at least the last injection. To calculate the duration of the first main injection, the correction values between the last injections corrected on the basis of the interaction can be taken into account. In a first process step the end of a preceding injection and the start of a following main injection can be selected such, in dependence on operating parameters of the internal combustion engine and in dependence on the quantity of fuel to be injected, that a time interval is present between the preceding injection and the main injection, and the time interval does not fall below a given value even through a lengthening of the duration of the preceding injection. The correction values can be determined experimentally by measurements in which the quantities of fuel injected by the injection valve are captured. Further correction values can be used for determining the durations of the injections of the current combustion process, and the further correction values take account of pressure fluctuations of injections of preceding combustion processes of the internal combustion engine.

In another method correction values for an injection behavior of an injection valve are determined, whereby the correction values take account of an influence of preceding injections of a combustion process of the same injection valve on the injection quantity. The method comprises the steps of activating an injection valve that is connected to a fuel reservoir to perform at least two successive test injections of an injection process in a test procedure, varying the parameters comprising the time interval between the two injections and the duration of the injection, measuring the quantities of fuel injected by the second injection, and determining a characteristic map or a table of values for the correction value from the parameters comprising measured injection quantity, time interval between the injections and duration of the second injection.

The test procedure can be carried out for various fuel pressures. The time interval between the two injections can be varied by a predefined duration, the variation of the time interval can be performed for various injection durations, for each injection the quantity of fuel injected can be measured, a characteristic map can be produced for the dependence of the quantity of fuel injected on the time interval and on the injection duration, and starting from the characteristic map, the correction value can be determined by interpolation for the pair of parameters comprising time interval and quantity of fuel to be injected. A function for describing the correction values can be obtained on the basis of the experimentally obtained correction values. The correction values can be determined experimentally by measurements in which the quantities of fuel injected by the injection valve are captured. Further correction values can be used for determining the durations of the injections of the current combustion process, and the further correction values take account of pressure fluctuations of injections of preceding combustion processes of the internal combustion engine.

In a preferred embodiment the correction value includes an oscillation factor which takes more precise account of the influence of the oscillations of the pressure fluctuations. The dependences on which the correction value is based are preferably determined experimentally for each type of injection valve and made available in a corresponding function or a corresponding table. By taking account of the influence of the pressure oscillations on the quantity fluctuations, precise allowance for pressure-fluctuation-induced quantity fluctuations in determining the injection duration is possible.

In a preferred embodiment sine and/or cosine functions are used as the oscillation factor. With the aid of the sine and cosine functions a relatively precise and simple description of the corrections for the most diverse types of injection valves is possible. The parameters of the function are dependent on the pressure and temperature of the fuel, and on the durations and quantities of all injections. Corrections which include operationally-determined changes in the hydraulic components (especially the injection valves) can also be taken into account.

In a further preferred embodiment the method according to the invention makes use of a correction value which includes at least partially a damping factor. By means of the damping factor, decaying of the pressure and quantity fluctuations is allowed for. In this way a more precise determination of the injection duration is possible.

In a simple and preferred embodiment a decaying exponential function which depends on the time difference between the following and the last injection is used as the damping factor. To calculate the duration of an injection the influence of all preceding, already corrected injections of a segment is taken into account. The influence of all the preceding injections of a segment on a following injection can be described substantially in the form of an additive superposing of the influences of each single injection of all the preceding injections on the following injection. By means of further correction terms the interactions of all the preceding injections on one another and their effect on the following injection can be taken into account.

In a further preferred method in which a plurality of pre-injections take place before a main injection, the injection duration for each pre-injection is calculated according to the above mentioned method, and for all pre-injections which have taken place before the main injection an interference factor is allowed for in each case in calculating the duration of the main injection.

In a further advantageous embodiment of the method, a minimum interval and a safety interval are defined in a first process step in determining the start and duration of the pre-injections and the start of the following main injection. In a following process step the corrected duration of the pre-injections is then calculated according to the method. The safety interval is advantageously so selected that with the lengthening of the durations of the pre-injections the time interval between the end of the pre-injections and the start of the main injection does not fall below the defined minimum time interval. With this method it is ensured that a minimum time interval between the pre-injections and the first main injection is reliably maintained. It is thereby ensured that despite the method according to the invention the quality of the injection and the quality of the torque output of the internal combustion engine are not detrimentally influenced.

Further correction values which take account of pressure fluctuations allowed for by preceding injections of combustion processes of the internal combustion engine are preferably used. Injection processes of the other injection valves can therefore also be taken into account.

BRIEF DESCRIPTION OF THE DRAWINGS

The invention is explained in more detail below with reference to the Figures, in which.

DETAILED DESCRIPTION

Figure 1:
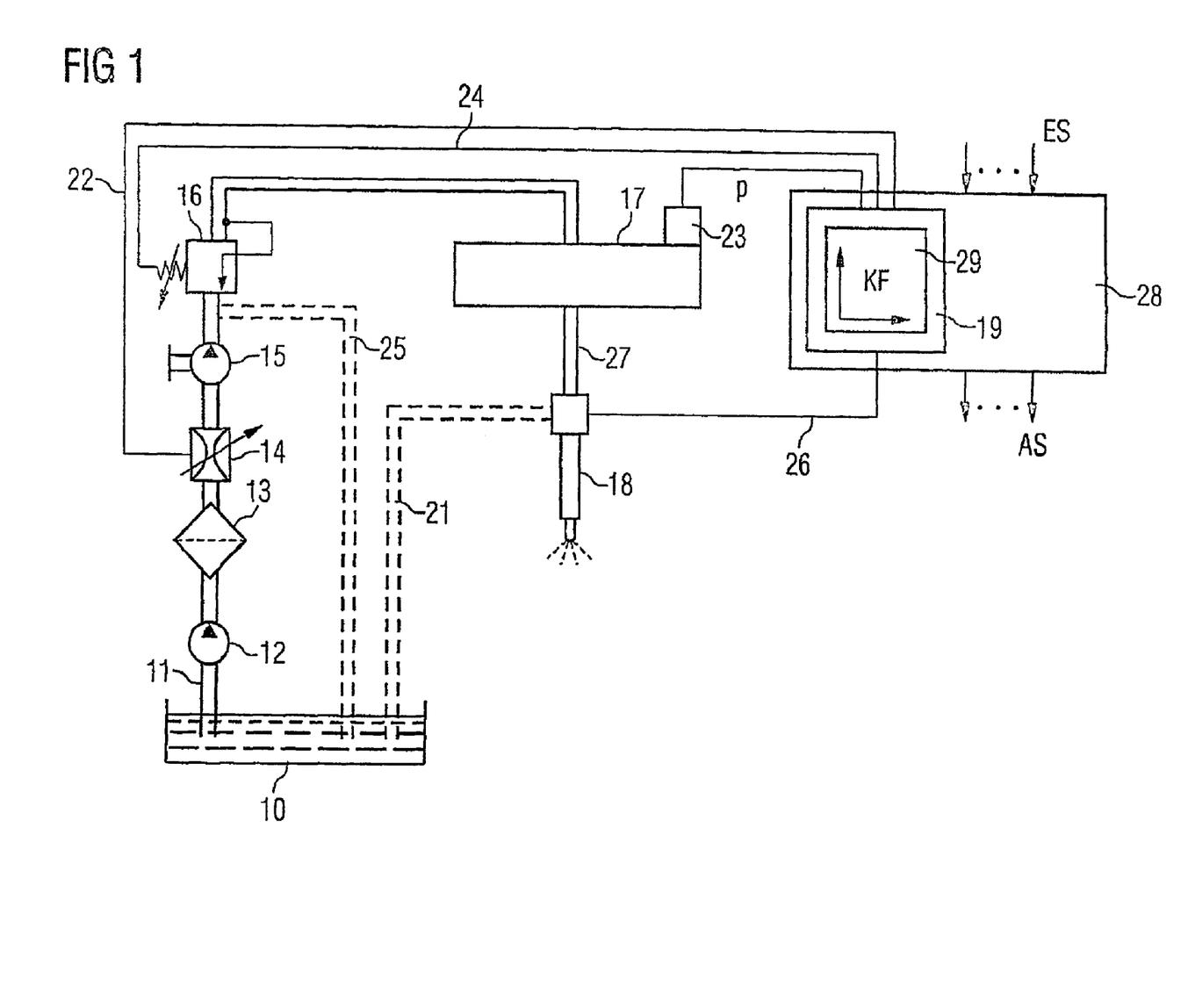
FIG. 1 is a schematic representation of an injection system for an internal combustion engine.

FIG. 1 shows a schematic structure of a fuel injection system for a direct-injection internal combustion engine used as a common rail injection system in internal combustion engines operating with diesel fuel or gasoline.

In the injection system fuel is drawn from a fuel reservoir 10 via a fuel line 11 by a pre-supply pump 12. The pre-supply pump 12 supplies the fuel via a fuel filter 13 to a high-pressure pump 15. The high-pressure pump 15 compresses the fuel under high pressure and feeds it into a high-pressure reservoir 17.

To be able to adjust the volume flow of the high-pressure pump 15 into the high-pressure reservoir 17 appropriately according to the current operating conditions of the internal combustion engine, an additional suction throttling valve 14 is arranged in the fuel line 11 between the pre-supply pump 12 and the high-pressure pump 15. By means of the suction throttling valve 14 the delivery flow of the high-pressure pump 15 is regulated. The suction throttling valve 14 is controlled by a control unit 19 via a first control line 22. The control unit 19 is preferably integrated in an electronic control device 28 of the internal combustion engine which controls and/or regulates all the processes required for the operation of the internal combustion engine. For this purpose a multiplicity of input signals ES received by means of suitable sensors is supplied to the control device 28 of the internal combustion engine. The individual actuators and components required for operation of the internal combustion engine are activated via corresponding output signals AS.

To be able to adjust the pressure in the high-pressure reservoir 17 according to the desired operating conditions of the internal combustion engine a pressure control valve 16 is also connected between the high-pressure pump 15 and the high-pressure reservoir 17. The pressure control valve 16 controls and/or regulates surplus fuel that is not required to maintain a desired pressure in the high-pressure reservoir 17 by diverting it to the fuel reservoir 10 via a return line 25. The holding pressure of the pressure control valve 16 is adjusted by the control unit 19 via a second control line 24. A pressure sensor 23 is also provided to regulate the pressure in the high-pressure reservoir 17. The pressure sensor 23 is used to detect the fuel pressure p prevailing in the high-pressure reservoir 17, on the basis of which fuel pressure p the control unit 19 effects the pressure regulation via the pressure control valve 16 according to the desired operating conditions of the internal combustion engine. Instead of the quantity regulation in the injection system described, a quantity-controlled high-pressure pump 15 may be provided which supplies the high-pressure reservoir 17 with fuel under appropriate pressure according to the desired operating conditions of the internal combustion engine.

By means of the pressure regulating devices that have been described, fuel pressures of up to 1800 bar can be generated in the high-pressure reservoir 17. The fuel pressure prevailing in the high-pressure reservoir 17 is applied to injection valves 18 via injection lines 27. The injection valves 18 are associated with combustion chambers of the internal combustion engine. The injection valves 18 generally include an injection valve nozzle which is closed by a needle under spring force. An injection process is triggered by the control unit 19 which is connected to the injection valves 18 via third control lines 26. The control unit 19 determines the start and duration of the respective injections. The injection valves 18 are also connected to the fuel reservoir 10 via leakage lines 21. Leakage flows occurring in the injection valves 18 are returned to the fuel reservoir 10 via the leakage lines 21.

In modern injection systems a plurality of injections into a combustion chamber of the internal combustion engine is performed for one combustion process, i.e. for one combustion cycle of a cylinder. A plurality of injections has the advantage that the combustion process can be controlled more precisely in order, for example, significantly to reduce the combustion noise in diesel engines by the use of at least one pre-injection and at least one main injection, and to reduce emissions by the use of further injections after the main injection. However, the performing of a plurality of injections via an injection valve 18 during a combustion process of a combustion chamber has the disadvantage that the individual injections cause pressure fluctuations at the injection valve 18 which affect the following injections. Pressure fluctuations cause a change in the mass of fuel delivered to the combustion chamber during the defined injection duration. The method according to the invention serves to take account of the pressure fluctuations for determining the injection duration and therefore for precisely metering the desired mass of fuel.

Figure 2:
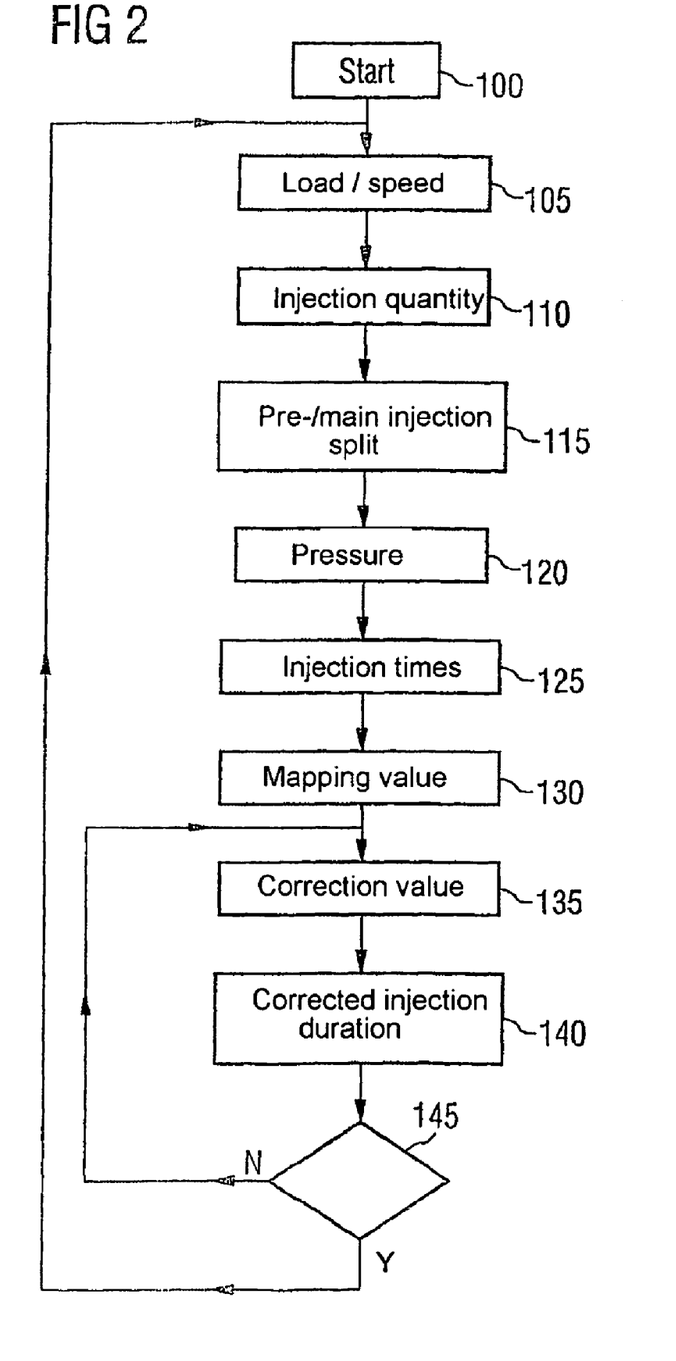
FIG. 2 is a chart to clarify the method according to the invention.

FIG. 2 shows the execution of the method by means of a schematic program flow. At program point 100 the control device 28 starts operation of the internal combustion engine. At the following program point 105 the control device 28 captures all essential operating parameters of the internal combustion engine, in particular engine load and speed values. The control unit 28 regulates the fuel pressure in the high-pressure reservoir 17 in dependence on the engine load and speed values. At the following program point 110 the control unit 19 calculates for each combustion chamber, i.e. for each cylinder of the internal combustion engine, the total quantity of fuel to be injected for the following combustion process. The control unit 19 then determines at the following program point 115 the division of the total injection quantity for a combustion process of a cylinder into a defined number of smaller pre-injection quantities and a defined number of larger main injection quantities. In the following example it is assumed that the total injection quantity is divided into two small pre-injections and two larger main injections. The injection quantity for a main injection is, for example, three times as large as the injection quantity for the pre-injection.

At the following program point 120 the control unit 19 detects the fuel pressure currently prevailing in the high-pressure reservoir 17 via the pressure sensor 23. At the following program point 125 the control unit 19 determines in dependence on the load and speed values of the internal combustion engine the injection times for the first and second pre-injections and for the first and second main injections. The control unit 19 then calculates at program point 130 the durations of the individual pre- and main injections in dependence on a characteristic map 29 which is stored in a memory of the control device 28. The durations of the injections are read out from the characteristic map in dependence on the measured fuel pressure and on the injection quantities determined at program point 115. The control unit 19 defines a first duration T1 for the first pre-injection, a second duration T2 for the second pre-injection, a third duration T3 for the first main injection and a fourth duration T4 for the second main injection.

At the following program point 135 the control unit 19 calculates a correction factor for the durations of the injections according to the following formula 1:

$$TI_{fol} = TI_{fol,bas}(p, mf_{fol}) + \Delta TI_{fol} \qquad (1).$$

$TI_{fol}$ denotes the corrected injection duration and $TI_{fol,bas}$ denotes a mapping value for the injection duration that has been determined from the characteristic map 29 in dependence on the fuel pressure p and the fuel quantity to be injected $mf_{fol}$. $\Delta TI_{fol}$ denotes a correction value for the injection duration. The mapping value is correct provided there are no influences through pressure fluctuations. The mapping value for the injection duration read out from the characteristic map 29 can therefore be used for the first pre-injection. For the following injections, however, it is necessary to determine the correction value for the injection duration. The pressure fluctuations caused by the last injection are taken account of through the correction value. The correction value may be in the form, for example, of a sum of exponentially decaying sine or cosine functions. For example, the correction value is calculated according to the following formula 2:

$$\Delta TI_{fol} = \sum_{i=1}^{N} A_i \sin(2\pi f_i \cdot t_{dif} + \varphi_i) \cdot \exp(-\gamma_i \cdot t_{dif}) \quad (2)$$

As the correction value for the injection duration, formula 2 takes account of the fuel pressure, the fuel temperature, the durations of the injections and the quantities of the injections. The amplitudes $A_i$ of formula 2 depend on the fuel pressure and on the duration of the last injection. Suitable tables or characteristic maps are stored for determining the amplitudes. Suitable correction terms can be used for taking account of the injection quantity of the following injection or of the start time of the following injection. In addition, corrections regarding the duration of the following injection can be taken into account.

$\varphi i$ denotes a correction term which depends on the fuel pressure and on the durations of the following and the last injection. For example, the phase angle $\varphi_i$ can be calculated according to the following formula 3:

$$\varphi_I = \varphi_{lst}(p, TI_{lst}) + \varphi_{fol}(p, TI_{fol,bas}) \quad (3),$$

where p denotes the fuel pressure, $TI_{lst}$ denotes the duration of the last injection and $TI_{fol,bas}$ denotes the duration of the following injection. The velocity of sound in the fuel depends on the fuel pressure and on the fuel temperature. To take account of the velocity of sound the frequencies $F_i$, which depend on the fuel pressure and on the fuel temperature, are used. The frequencies $f_i$ are determined experimentally.

Formula 2 also contains a damping constant $\gamma_i$. The damping of the pressure waves generated by the injections depends on the fuel pressure p, on the fuel temperature TFU and on the durations of the last and the following injection. For example, the damping constant $\gamma_i$ can be calculated according to the following formula (4):

$$\gamma_I = const_i \cdot f_i \quad (4),$$

where $const_i$ denotes a pre-factor.

Formula 2 also contains a time difference $t_{dif}$ which refers to the time difference between the end of the last injection and the start of the following injection. The index i of formula 2 refers to the number of coefficients, which is determined by the number of frequencies which are necessary for determining the correction term. Normally, a small number of, for example, N=2 is sufficient to determine the correction term relatively precisely.

Figure 3:
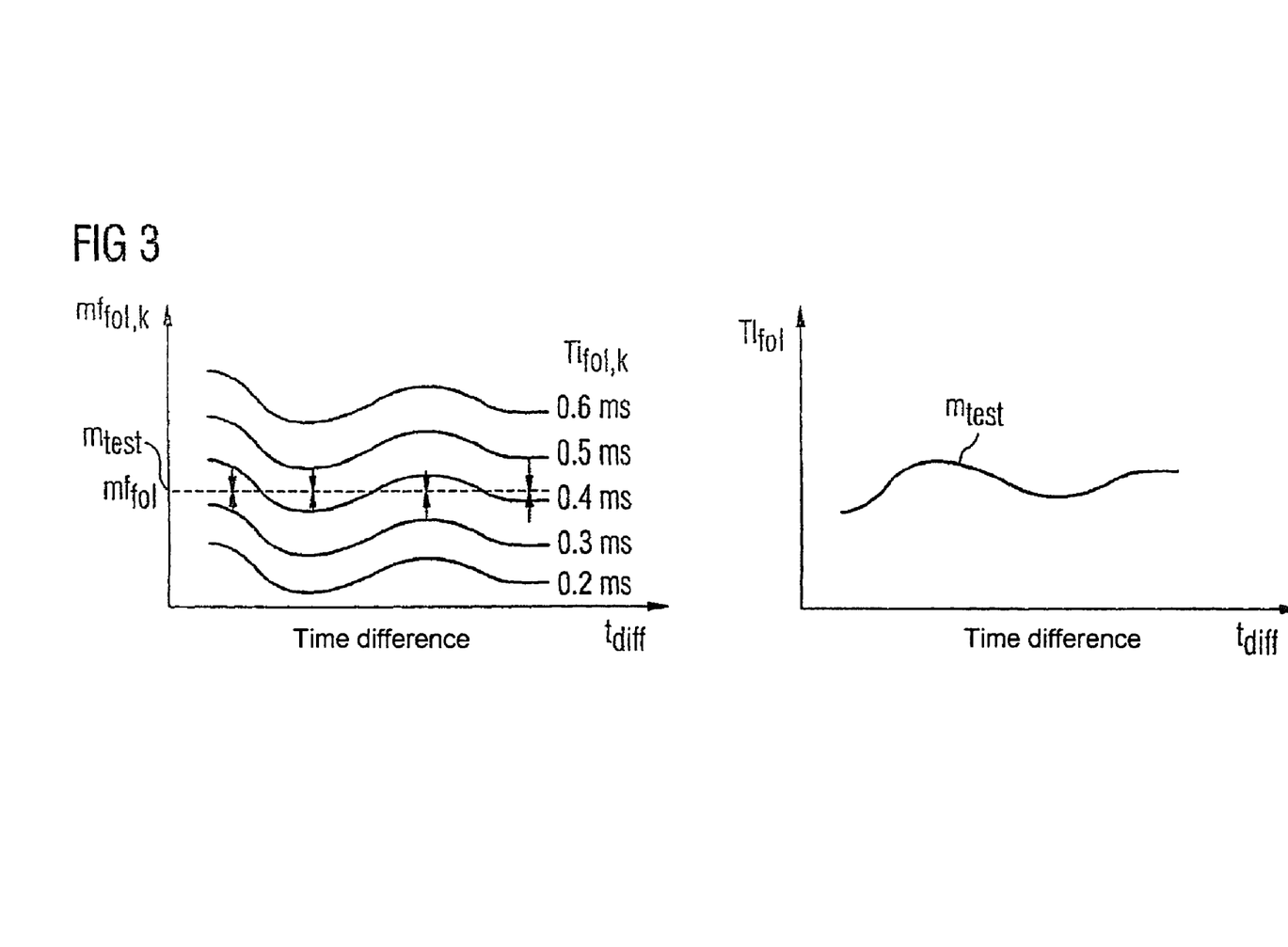
FIG. 3 is a graph to clarify the determination of the correction factor.

Formula 2 is used to calculate correction values for the duration of an injection. The dependence of the parameters on fuel pressure, fuel temperature, injection durations and injection quantities is determined experimentally and stored in corresponding tables or characteristic maps. The dependences are determined by measuring the duration of the following injection which is necessary to obtain a constant injection quantity independent of the time difference $t_{dif}$. During the measurement the time difference between the last and the following injection is varied from the smallest usable time difference to a maximum value of, for example, a few milliseconds. The injection pressure and the injection duration are maintained constant for the last injection during the measurement procedure. FIG. 3 shows in the left-hand graph a characteristic map for an injection which has already preceded an injection of the same combustion. The curves shown are determined experimentally and represent the quantities of fuel $mf_{fol,k}$ actually injected for different injection durations $TI_{fol,k}$ in dependence on the time difference $t_{dif}$. From the graph shown on the left, the corresponding injection duration $TI_{fol,k}$ can be calculated for a desired injection quantity by interpolation in dependence on the time difference $t_{dif}$. For example, if the injection durations for the injection quantity $m_{test}$ are to be determined via the time difference $t_{dif}$, a characteristic curve for the injection durations $TI_{fol}$ is obtained in dependence on the time difference $t_{dif}$, as represented in the right-hand graph.

To determine the correction values, the mapping values stored for the operating point are subtracted from the injection durations $TI_{fol,k}$ determined in the test procedure, in order to obtain the correction values. The correction values are stored in tables or characteristic maps which depend on the fuel pressure, the quantity of fuel to be injected, the time difference and the injection duration.

To reduce the memory requirement, the characteristic curve maps for the correction values are preferably not themselves stored, but the characteristic curve maps are stored in the form of the formulae 1 to 4; which permit a relatively accurate determination of the correction values.

In a further test procedure the injection duration $TI_{fol}$ for a given time difference $t_{dif}$ is varied until the following injection yields the desired injection quantity. The fuel quantity delivered by the injection valve is measured. In a different approach the injection quantities $mf_{fol,k}$ of the following injection are captured in a grid in dependence on the injection durations of the following injection $TI_{fol,k}$, where k runs from 1 to L. The injection durations for the following injection $TI_{fol}$, which are needed to obtain a desired injection quantity $mf_{fol}$, are determined iteratively using interpolation procedures based on the following relationship: $mf_{fol,k} = mf_{fol}(TI_{fol,k})$.

As shown in FIG. 3, the calculations and measurements must be carried out repeatedly for different pressures and durations of the first injection and for different injection quantities of the following injection.

The injection durations $TI_{fol}$ of the following injection are functions of the time difference $t_{dif}$ with parametric dependences on fuel pressure, fuel temperature, the injection durations of the first injection, the desired injection quantities of the following injection and further values. In particular, there are correction possibilities which take account of operationally determined changes in the hydraulic components, for example, the injection valves.

The amplitudes $A_i$, the frequencies $f_i$, the phases $\varphi_i$ and the damping factors $\gamma_i$, which are used for determining the duration of the following injection $TI_{fol}$, are calculated according to a least-square estimation method from formulae 1 and 2. To optimize the formulae and to reduce numerical inaccuracies, the results of all estimation formulae are preferably compared to one another and analyzed.

An alternative approach to determining the functional dependences of amplitudes, frequencies, phases and damping factors consists in an automated measurement procedure in which a suitable network of measuring points, which is determined by pressures, injection durations, injection quantities and time differences, is used to achieve an optimum design of the formulae 1 and 2. The measurement procedure makes use of measured injection quantities in order to determine the parameters comprising injection duration, time difference and fuel pressure.

In a case of three or more injections for one injection process of a cylinder of an internal combustion engine, the following formula 5 is used:

$$TI_N = TI_{N,bas}(p, mf_N) + \Delta TI(1,N) + \Delta TI(2,N) + \ldots + \Delta TI(N-1,N) \quad (5).$$

The N-th injection, which is referred to as the following injection, is influenced by the pressure waves which have been generated by all the preceding N−1 injections. According to the superposition principle the corrected duration $TI_N$ of the N-th injection of formula 3 is calculated. $TI_{N,bas}$ $(p,mf_N)$ designates the mapping value for the duration of the N-th injection which was read out from the characteristic map on the basis of the measured fuel pressure p and the desired injection quantity $mf_N$. Each of the individual terms $\Delta TI$ (j,N), where j runs from 1 to N−1, is calculated according to the method that was described in the preceding section and designates the correction value between the j-th and the N-th injection.

In formula 5 only the effects between the first and the N-th, between the second and the N-th, etc., up to the N−1-th and the N-th injection are taken into account. That the first influences the second, the second the third and the N−1 the N-th injection, is neglected. The reciprocal influencing of the individual injections can be allowed for via appropriate correction terms.

The use of the method according to the invention to adapt the injection durations must fulfill various requirements. For a correction of the duration of an injection being considered the following values must be determined and must not be changed: the start of the durations of all injections, the duration of all preceding injections and the desired quantity of the injection being considered. A correction of a duration of an injection being considered is achieved by changing the end of the injection while the start of the injection remains constant. Because a correction of the injection being considered normally causes a change in the time intervals to all the other injections, the injection being considered must be corrected before all the following injections are subjected to a correction procedure. For the above-mentioned requirements to be fulfilled the correction procedure according to the invention must be combined with the control procedure of the internal combustion engine, which carries out a last check of the interval times between the injections and the durations of the injections.

Figure 4A:
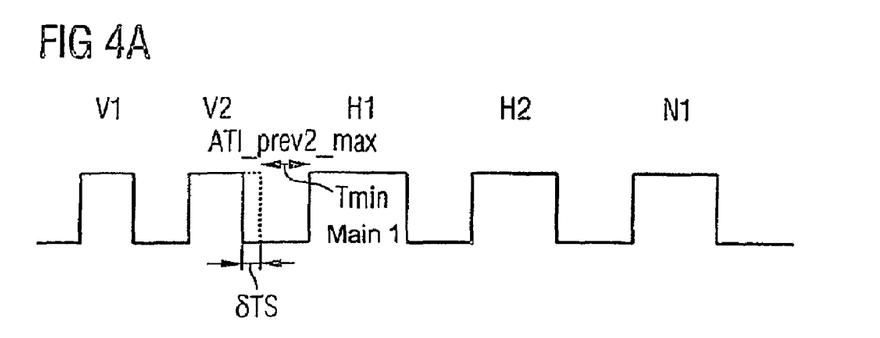
FIG. 4 shows graphs of injection sequences.
Figure 4B:
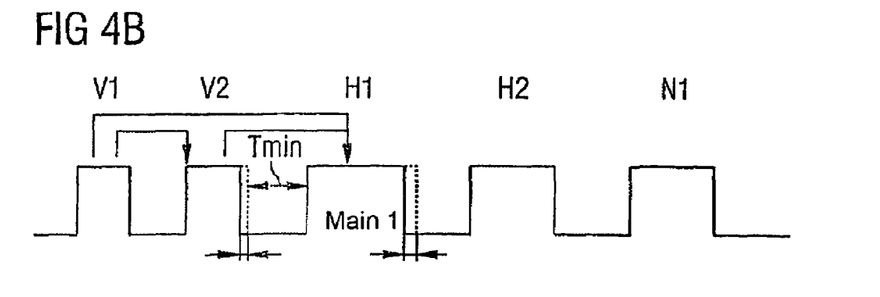
Figure 4C:
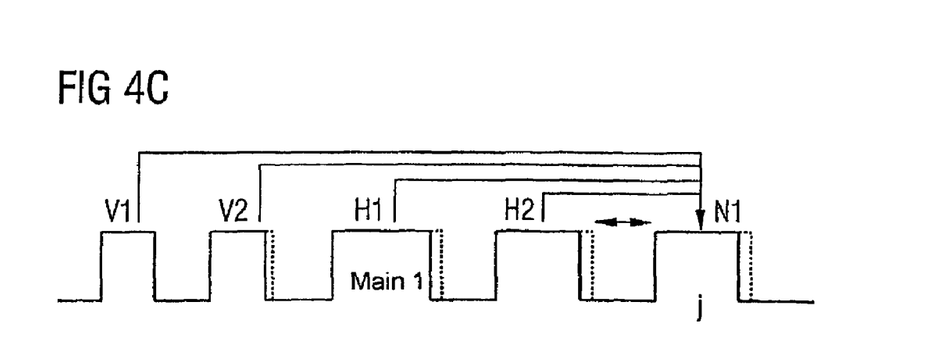

The checking procedure is explained in more detail below with reference to FIG. 4. The start and duration of the first main injection are normally calculated and determined first. The first main injection is the most important injection for the torque delivered by the internal combustion engine. Possible corrections of the durations of injections carried out before the first main injection must not displace the interval time between the first main injection and the preceding pre-injections below a minimum interval value. This can be prevented by introducing a sufficient additional safety interval after each corrected injection which is carried out before the first main injection, as represented in the top, first graph of FIG. 4. FIG. 4 shows three series of injections in an internal combustion engine, arranged one above another. In the first graph A two pre-injections V1, V2, a first main injection H1, a second main injection H2 and a post-injection N1 are represented. The second pre-injection V2 is displaced so far forward in relation to the first main injection H1 that a sufficient safety time interval $\delta TS$ is present between the end of the second pre-injection V2 and the start of the first main injection H1, in addition to the minimum time interval $T_{min}$ to be maintained.

After the time intervals between the individual injections have been determined, the durations of the injections occurring before the first main injection H1, and the duration of the first main injection, can be corrected according to the inventive method. In the second graph B of FIG. 4 a corresponding correction procedure is represented schematically. No correction needs to be calculated for the first pre-injection V1 since no injection which causes a perceptible pressure fluctuation for the first pre-injection V1 takes place before the first pre-injection V1. The duration of the first pre-injection V1 therefore does not need to be corrected. The duration of the second pre-injection V2 is calculated according to formula 1, a correction value for the pressure fluctuation caused by the first pre-injection V1 being calculated in addition to the mapping value. The correction value calculated according to formulae 1 and 2 attains at most the value $\delta TS$ but in general is significantly lower. As is shown in the exemplary embodiments illustrated, the end of the second pre-injection V2 can be displaced to a later time on the basis of the correction value. However, because of the safety interval $\delta TS$ the minimum time interval $T_{min}$ in to be maintained between the end of the second pre-injection V2 and the start of the first main injection H1 is maintained. For the first main injection H1 the mapping value is calculated according to formula 5 and a first correction value for the influencing by the first pre-injection V1 and a second correction value through the influencing of the corrected second pre-injection V2 are calculated.

In the third graph line C of FIG. 4 the calculation of the correction of the injections after the first main injection H1 is represented. These are still injections which are delivered for the same combustion in a cylinder. The duration of a j-th injection Hj is calculated according to formula 5. In this case correction values between the j-th injection and each preceding injection of this injection process of this cylinder are taken into account. A further improvement of the method according to the invention is achieved by taking account of all relevant variables of the total hydraulic system that have an influence on the injection quantity, using suitable correction terms of formulae 1 to 5. In this case influences between injection processes of different cylinders or between successive combustion processes can also be taken into account.

After the corrected duration of an injection has been calculated at program point 140, it is checked at the following program point 145 whether all the injections of the injection process, or of the combustion process of the cylinder, have been corrected. If this is the case the program branches back to program point 105. However, if the interrogation at program point 145 yields the result that not all injections have yet been corrected in relation to pressure fluctuations the program branches back to program point 135 and a corrected duration for the following injection is determined according to the method described above.

In this way, starting with the second pre-injection, the injection durations for all the injections are corrected in turn according to formulae 1 to 5. Through the successive correction of the durations of the injections, the corrected durations of the preceding injections can already be taken into account in calculating the correct duration of a following injection. A precise determination of the injection duration, and therefore a precise metering of the desired quantity of fuel, is therefore possible.

The influence of all preceding injections of a combustion process on a following injection can be described substantially in the form of an additive superposition of the influences of each single injection of all the preceding injections on the following injection. The reciprocal effects of all preceding injections among themselves, and their effect on the following injection, can be taken into account by means of further correction terms.

Further correction values which take account of pressure fluctuations of preceding injections of other injection valves of the internal combustion engine are preferably used in determining the injection duration. The further correction values are determined according to the same method as the correction values.

What is claimed is:

1. A method for determining the injection duration of an injection of fuel into an internal combustion engine, whereby the injection duration is determined in dependence on the fuel pressure and in dependence on the quantity of fuel to be injected, the method comprising the steps of:
   determining the injection duration from a first mapping value and a correction value,
   reading out the mapping value from a characteristic map in dependence on the fuel pressure and in dependence on the mass of fuel to be injected, and
   calculating the correction value in dependence on the time interval between the following injection and the last injection, wherein the correction value is described using a function which includes an oscillation factor which takes account of the influence on the injection quantity of the pressure fluctuations generated by at least the last injection in determining the injection duration, and further wherein the oscillation factor includes a sine and/or cosine function.

2. A method according to claim 1, wherein parameters of the function depend on the pressure and the temperature of the fuel and on the durations and quantities of the injections.

3. A method according to claim 1, wherein the function includes correction values, and the correction values encompass operationally determined changes in the hydraulic components, in particular in injection valves.

4. A method according to claim 1, wherein in calculating the duration of an injection the influence of all the preceding already corrected injections of an injection process is taken into account.

5. A method according to claim 1, wherein the correction factor includes a damping factor, and the damping factor takes account of decaying of the pressure fluctuation generated by at least the last injection.

6. A method according to claim 5, wherein the damping factor is configured in the form of a decaying exponential function, and the exponential function depends on the time difference between the following injection and at least the last injection.

7. A method according to claim 1, wherein, to calculate the duration of the first main injection, the correction values between the last injections corrected on the basis of the interaction are taken into account.

8. A method according to claim 1, wherein in a first process step the end of a preceding injection and the start of a following main injection are so selected, in dependence on operating parameters of the internal combustion engine and in dependence on the quantity of fuel to be injected, that a time interval is present between the preceding injection and the main injection, and the time interval does not fall below a given value even through a lengthening of the duration of the preceding injection.

9. A method according to claim 1, wherein the correction values are determined experimentally by measurements in which the quantities of fuel injected by the injection valve are captured.

10. A method according to claim 1, wherein further correction values are used for determining the durations of the injections of the current combustion process, and the further correction values take account of pressure fluctuations of injections of preceding combustion processes of the internal combustion engine.

11. A method for determining correction values for an injection behavior of an injection valve, whereby the correction values take account of an influence of preceding injections of a combustion process of the same injection valve on the injection quantity, the method comprising the steps of:
   activating an injection valve that is connected to a fuel reservoir to perform at least two successive test injections of an injection process in a test procedure,
   varying the parameters comprising the time interval between the two injections and the duration of the injection,
   measuring the quantities of fuel injected by the second injection, and
   determining a characteristic map or a table of values for the correction value from the parameters comprising measured injection quantity, time interval between the injections and duration of the second injection.

12. A method according to claim 11, wherein the test procedure is carried out for various fuel pressures.

13. A method according to claim 11, wherein:
   the time interval between the two injections is varied by a predefined duration,
   the variation of the time interval is performed for various injection durations,
   for each injection the quantity of fuel injected is measured,
   a characteristic map is produced for the dependence of the quantity of fuel injected on the time interval and on the injection duration, and
   starting from the characteristic map, the correction value is determined by interpolation for the pair of parameters comprising time interval and quantity of fuel to be injected.

14. A method according to claim 11, wherein a function for describing the correction values is obtained on the basis of the experimentally obtained correction values.

15. A method according to claim 11, wherein the correction values are determined experimentally by measurements in which the quantities of fuel injected by the injection valve are captured.

16. A method according to claim 11, wherein further correction values are used for determining the durations of the injections of the current combustion process, and the further correction values take account of pressure fluctuations of injections of preceding combustion processes of the internal combustion engine.

17. A system for determining the injection duration of an injection of fuel into an internal combustion engine, whereby the injection duration is determined in dependence on the fuel pressure and in dependence on the quantity of fuel to be injected, comprising:
   means for determining the injection duration from a first mapping value and a correction value,
   means for reading out the mapping value from a characteristic map in dependence on the fuel pressure and in dependence on the mass of fuel to be injected, and
   means for calculating the correction value in dependence on the time interval between the following injection and the last injection, wherein the correction value is described using a function which includes an oscillation factor which takes account of the influence on the injection quantity of the pressure fluctuations generated by at least the last injection in determining the injection duration, and further wherein the oscillation factor includes a sine and/or cosine function.

* * * * *

UNITED STATES PATENT AND TRADEMARK OFFICE
CERTIFICATE OF CORRECTION

PATENT NO. : 7,152,575 B2 Page 1 of 1
APPLICATION NO. : 11/246425
DATED : December 26, 2006
INVENTOR(S) : Jürgen Fritsch et al.

It is certified that error appears in the above-identified patent and that said Letters Patent is hereby corrected as shown below:

Title Page
Please amend the Related U.S. Application Data on the face of the patent at line (65) by deleting "PCT/EP04/03303" and replacing with --PCT/EP2004/003303--. It should read:

-- **(63) Continuation application No. PCT/EP2004/003303,
filed on March 29, 2004** --

Please insert the following Foreign Application Priority Data on the face of the patent at line (30):
-- April 11, 2003 (DE) 103 16 811 --

Signed and Sealed this

Twentieth Day of February, 2007

JON W. DUDAS
*Director of the United States Patent and Trademark Office*